United States Patent
Belin et al.

(10) Patent No.: US 12,049,854 B2
(45) Date of Patent: Jul. 30, 2024

(54) TURBOFAN HAVING MOBILE DEFLECTORS AND A SYSTEM FOR ACTUATING THE DEFLECTORS

(71) Applicant: Airbus Operations SAS, Toulouse (FR)

(72) Inventors: Michael Belin, Toulouse (FR); Lionel Sillieres, Toulouse (FR); Julie Cazalis, Toulouse (FR); Simon Vanderbauwede, Toulouse (FR); Samuel Magne, Toulouse (FR)

(73) Assignee: Airbus Operations SAS, Toulouse (FR)

(*) Notice: Subject to any disclaimer, the term of this patent is extended or adjusted under 35 U.S.C. 154(b) by 0 days.

(21) Appl. No.: 18/490,833

(22) Filed: Oct. 20, 2023

(65) Prior Publication Data

US 2024/0133351 A1    Apr. 25, 2024

(51) Int. Cl.
*F02K 1/76*    (2006.01)

(52) U.S. Cl.
CPC .............. *F02K 1/766* (2013.01); *F02K 1/763* (2013.01); *F05D 2220/323* (2013.01); *F05D 2260/50* (2013.01)

(58) Field of Classification Search
CPC . F02K 1/766; F02K 1/763; F02K 1/72; F02K 1/09; F02K 1/625; B64D 29/06; F05D 2220/323; F05D 2250/34; F05D 2260/50
See application file for complete search history.

(56) References Cited

U.S. PATENT DOCUMENTS

| 3,500,645 | A  | * | 3/1970  | Felix ......................... F02K 1/72 |
|           |    |   |         | 239/265.29 |
| 6,021,636 | A  | * | 2/2000  | Johnson .................. E05B 81/10 |
|           |    |   |         | 244/110 B |
| 11,255,293 | B2 | * | 2/2022  | Gardes ..................... F02K 1/72 |
| 2007/0273159 | A1 | * | 11/2007 | Rouyer .................. F02K 1/766 |
|           |    |   |         | 292/201 |
| 2013/0280031 | A1 | * | 10/2013 | Hurlin ..................... F01D 25/24 |
|           |    |   |         | 415/213.1 |
| 2013/0292489 | A1 |   | 11/2013 | Vauchel et al. |

(Continued)

FOREIGN PATENT DOCUMENTS

FR          2991670 A1     12/2013

OTHER PUBLICATIONS

French Search Report for corresponding French Patent Application No. 22110005 dated Apr. 12, 2023; priority document.

*Primary Examiner* — Jason H Duger
(74) *Attorney, Agent, or Firm* — Greer, Burns & Crain, Ltd.

(57) ABSTRACT

A turbofan with a nacelle having a fixed structure, a mobile assembly bearing second blocking element and able to move between an advanced position and a withdrawn position, a set of deflectors able to move in translation between an advanced position and a withdrawn position, and an actuation system having a carriage, a blocking lever bearing first attachment element and able to move between a blocking position and a free position, and a transmission system configured to move the blocking lever from the blocking position to the free position when the mobile assembly reaches a tilting position between the advanced position and the withdrawn position.

4 Claims, 6 Drawing Sheets

(56) References Cited

U.S. PATENT DOCUMENTS

| | | | |
|---|---|---|---|
| 2014/0131515 A1* | 5/2014 | Caruel | F02K 1/54 |
| | | | 244/110 B |
| 2015/0097056 A1* | 4/2015 | Caruel | F02K 1/766 |
| | | | 239/265.19 |
| 2017/0167439 A1* | 6/2017 | Crawford | F02K 3/06 |
| 2017/0226962 A1* | 8/2017 | Crawford | F04D 29/522 |
| 2017/0292474 A1* | 10/2017 | Davies | F02K 1/763 |
| 2020/0080513 A1* | 3/2020 | Presseq | F02K 1/72 |

* cited by examiner

TURBOFAN HAVING MOBILE DEFLECTORS AND A SYSTEM FOR ACTUATING THE DEFLECTORS

CROSS-REFERENCES TO RELATED APPLICATIONS

This application claims the benefit of the French patent application No. 2211005 filed on Oct. 24, 2022, the entire disclosures of which are incorporated herein by way of reference.

FIELD OF THE INVENTION

The present invention relates to a turbofan for an aircraft, having a mobile cowl, mobile deflectors and a system for actuating the deflectors, and to an aircraft having at least one such turbofan.

BACKGROUND OF THE INVENTION

An aircraft has a fuselage, to each side of which is fastened a wing. Beneath each wing is suspended at least one turbofan. Each turbofan is fastened beneath the wing by way of a pylon that is fastened between the structure of the wing and the structure of the turbofan.

The turbofan has a motor and a nacelle that is fastened around the motor. The turbofan has a fan that is at the front of the motor and draws outside air from the front towards the rear of the turbofan. At the rear of the fan, the air is divided into a primary flow that follows a primary duct inside the motor and a secondary flow that follows a secondary duct between the motor and the nacelle.

The nacelle has a fixed structure, to which are fastened the fan and the motor and certain fixed cowls of the nacelle. The nacelle also has mobile cowls that move on the fixed structure between an advanced position and a withdrawn position. In the withdrawn position, which corresponds to thrust reversal of the turbofan, a window is open between the secondary duct and the outside so as to evacuate the air from the secondary duct.

In order to best guide the air towards the front, deflectors (also called "cascades") are fastened so as to be positioned across the window when the mobile cowls are in the withdrawn position. The deflectors are thus housed in the mobile cowls, which in turn increases the dimensions of the mobile cowls so as to make it possible to house the deflectors, this also bringing about an increase in the aerodynamic lines of the nacelle and, therefore, a greater fuel consumption.

SUMMARY OF THE INVENTION

An object of the present invention is to propose a turbofan for an aircraft, having a mobile cowl, mobile deflectors and an actuation system that makes it possible to move the deflectors at the same time as the mobile cowl and thus to limit the impact of the deflectors on the dimensions of the mobile cowl.

To that end, there is proposed a turbofan having a motor with a fan casing and a nacelle that surrounds the motor, wherein a duct for a secondary flow is delimited between the nacelle and the motor, the nacelle having:

a fixed structure having a fixed cowl around the fan casing and second stopping means,
a mobile assembly that is able to move in translation on the fixed structure and has second blocking means and a slider bearing a mobile cowl, wherein the mobile assembly is able to move between an advanced position in which the slider is positioned such that the mobile cowl is close to the fan casing and the fixed cowl and a withdrawn position in which the slider is positioned such that the mobile cowl is distanced from the fan casing and the fixed cowl so as to define between them a window that is open between the duct and the outside of the nacelle,
actuators designed and configured to move, from the advanced position, the slider in translation to the withdrawn position and vice versa,
deflectors mounted so as to be able to move in translation on the fixed structure between an advanced position corresponding to the advanced position in which the deflectors are housed between the fan casing and the fixed cowl and a withdrawn position in which the deflectors are positioned across the window, and
at least one actuation system, each one having:
a carriage secured to the deflectors,
a blocking lever mounted articulated on the carriage and bearing first blocking means, wherein the blocking lever is able to move in rotation between a blocking position in which the first blocking means are secured to the second blocking means and a free position in which the first blocking means are not secured to the second blocking means and vice versa, and
a transmission system designed, on the one hand, to move the blocking lever from the blocking position to the free position when the mobile assembly reaches a tilting position between its advanced position and its withdrawn position starting from its advanced position, and, on the other hand, to move the blocking lever from the free position to the blocking position when the mobile assembly reaches the tilting position between its withdrawn position and its advanced position starting from its withdrawn position, wherein, when the mobile assembly is in the tilting position, the deflectors are in their withdrawn position, and wherein the transmission system has:
a stopping lever mounted articulated on the carriage and bearing first stopping means, wherein the stopping lever is able to move in rotation between a standby position in which the first stopping means are not secured to the second stopping means and a stopping position in which the first stopping means are secured to the second stopping means and vice versa, and
an arm with a first end mounted articulated with the stopping lever and a second end mounted articulated with the blocking lever, wherein the arm is arranged such that the tilting of the stopping lever from the standby position to the stopping position corresponds to the tilting of the blocking lever from the blocking position to the free position and such that the tilting of the blocking lever from the free position to the blocking position corresponds to the tilting of the stopping lever from the stopping position to the standby position, wherein the transmission system has at least one damper and wherein, for each damper, a first end of the damper is mounted articulated to the blocking lever and a second end is mounted articulated to the stopping lever.

Putting such a transmission system in place ensures a minimum bulk and movement without impact.

Advantageously, in the free position, the blocking lever comes to abut against a first stop of the arm.

Advantageously, in the standby position, the stopping lever comes to abut against a second stop of the arm.

The invention also proposes an aircraft having at least one turbofan according to one of the preceding variants.

BRIEF DESCRIPTION OF THE DRAWINGS

The abovementioned features of the invention, along with others, will become more clearly apparent upon reading the following description of one exemplary embodiment, the description being given with reference to the appended drawings, in which.

DETAILED DESCRIPTION OF THE PREFERRED EMBODIMENTS

Figure 1:
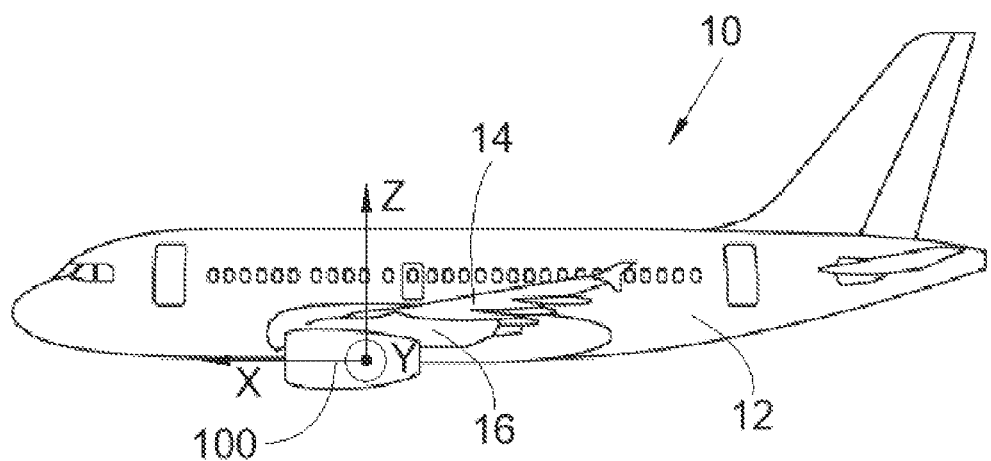
FIG. 1 is a side view of an aircraft having a turbofan according to the invention.

In the following description, terms relating to a position are considered in relation to an aircraft in a position of forward movement as shown in FIG. 1.

FIG. 1 shows an aircraft 10 that has a fuselage 12, to each side of which is fastened a wing 14 that bears at least one turbofan 100 according to the invention. The turbofan 100 is fastened beneath the wing 14 by way of a pylon 16.

Figure 2:
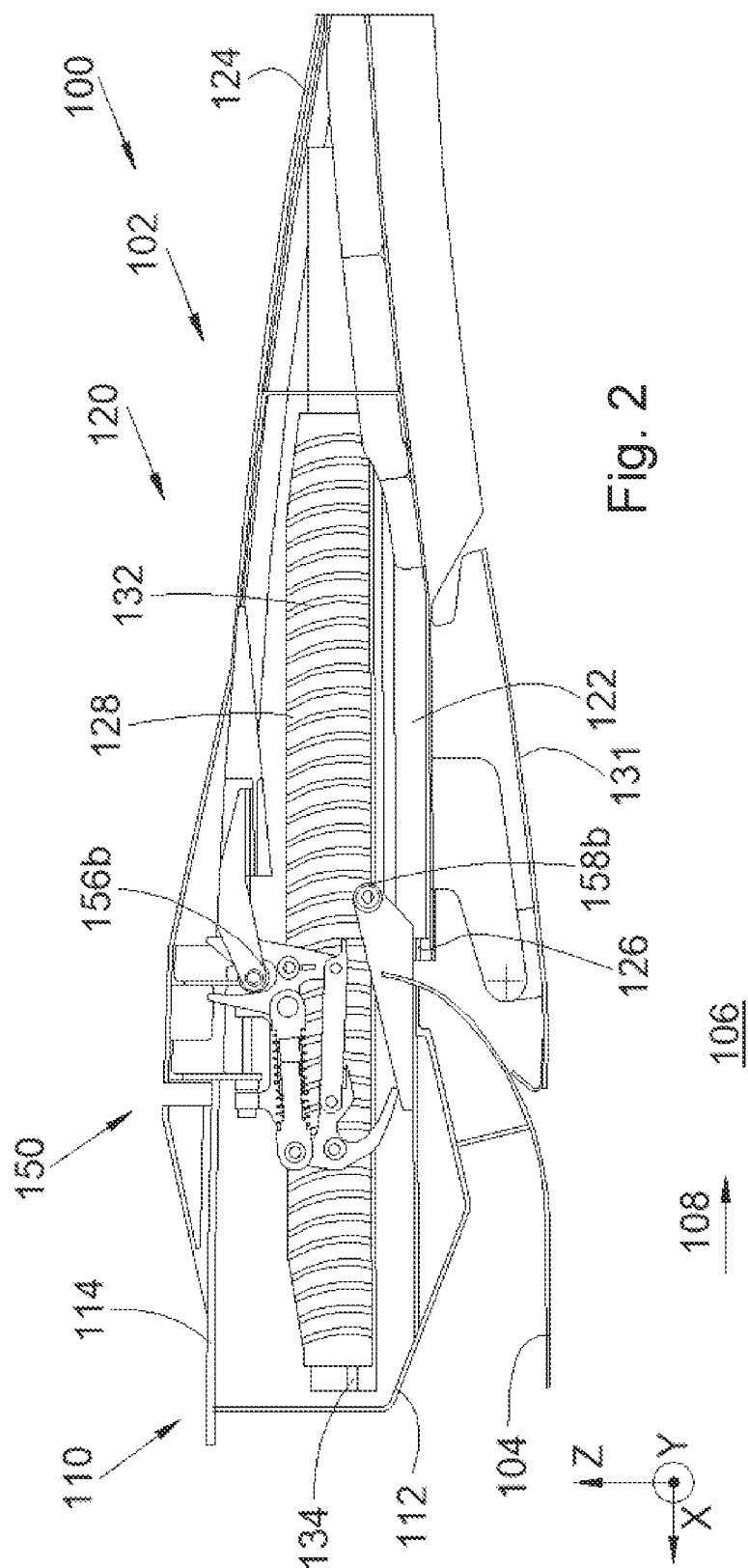
FIG. 2 is a side view in cross section of the turbofan according to the invention in the advanced position.

FIG. 2 shows a cross section of the turbofan 100 that has a nacelle 102 and a motor that is housed inside the nacelle 102 and that has a fan casing 104 that surrounds a fan mounted at the front of the motor inside the air intake of the nacelle 102.

In the following description, and by convention, X denotes the longitudinal axis of the turbofan 100, which is parallel to the longitudinal axis of the aircraft 10, with positive orientation in the direction of forward movement of the aircraft 10, Y denotes the transverse axis, which is horizontal when the aircraft is on the ground, and Z denotes the vertical axis, which is vertical when the aircraft is on the ground, these three axes X, Y and Z being mutually orthogonal.

The turbofan 100 has, between the nacelle 102 and the motor and at the rear of the fan, a duct 106 in which there circulates the secondary flow 108 coming from the air intake through the fan.

The nacelle 102 has a fixed structure 110 that is mounted fixedly on the fan casing 104. The fixed structure 110 is in this case made up of a front frame 112 mounted around the fan casing 104 and fastened to the latter. The fixed structure 110 also has a fixed cowl 114 fastened around the front frame 112 and the fan casing 104.

The nacelle 102 has a mobile assembly 120 that has a slider 122 that takes the form, for example, of a cylinder with openwork walls and a mobile cowl 124 forming the walls of the nozzle and borne by the slider 122. The mobile cowl 124 is, in this case, fastened to the rear of the slider 122.

The slider 122 is mounted so as to be able to move in translation in a direction of translation generally parallel to the longitudinal axis X on the fixed structure 110 of the nacelle 102.

The mobile assembly 120 is able to move in translation in the direction of translation between an advanced position (FIG. 2) and a withdrawn position (FIG. 5) and vice versa. In the advanced position, the slider 122 is positioned as far forward as possible, such that the mobile cowl 124 is close to the fan casing 104 and the fixed cowl 114. In the withdrawn position, the slider 122 is positioned as far aft as possible, such that the mobile cowl 124 is distanced from the fan casing 104 and the fixed cowl 114.

Figure 3:
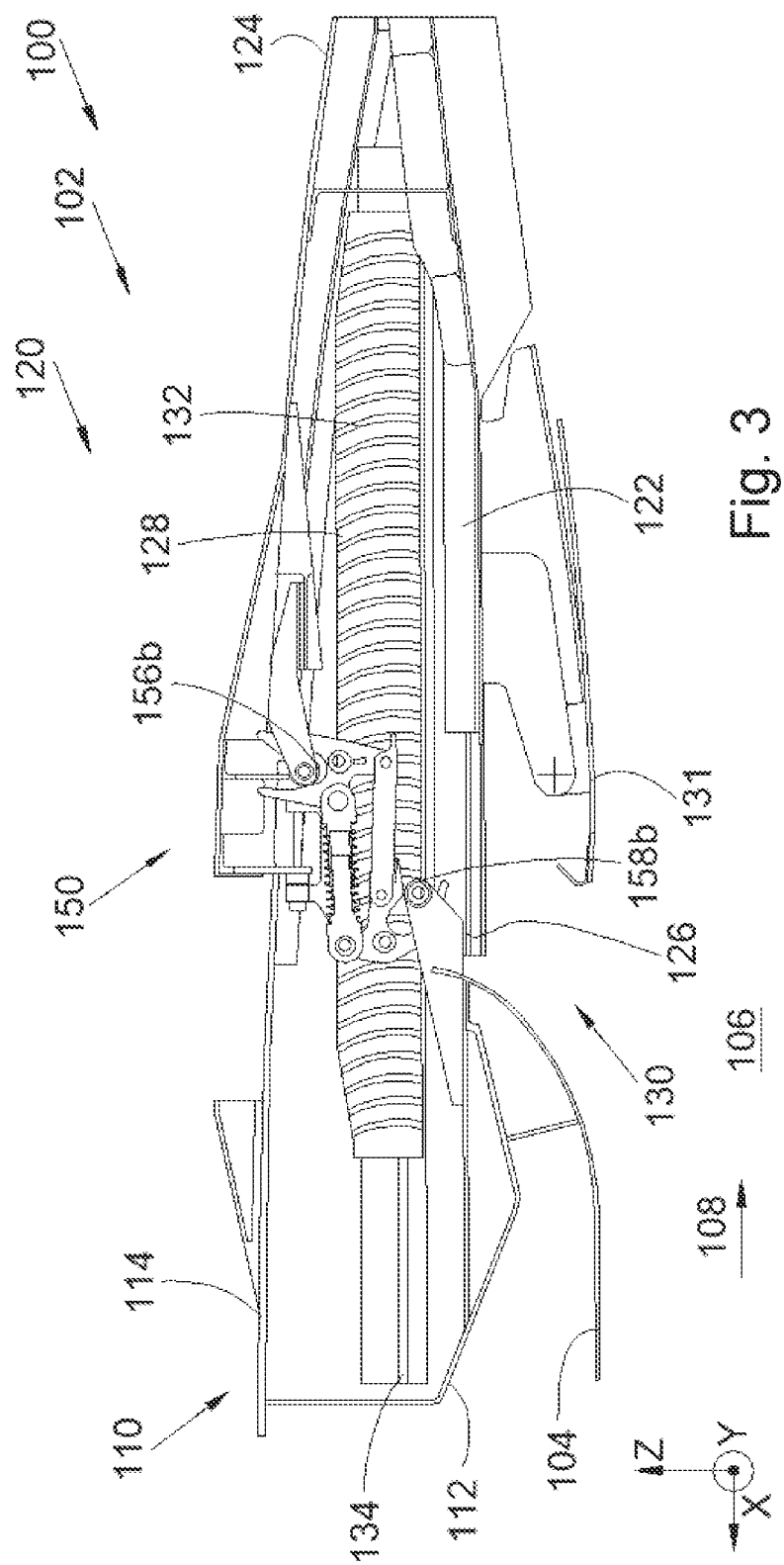
FIG. 3 is the same view as FIG. 2 in a first intermediate position.
Figure 4:
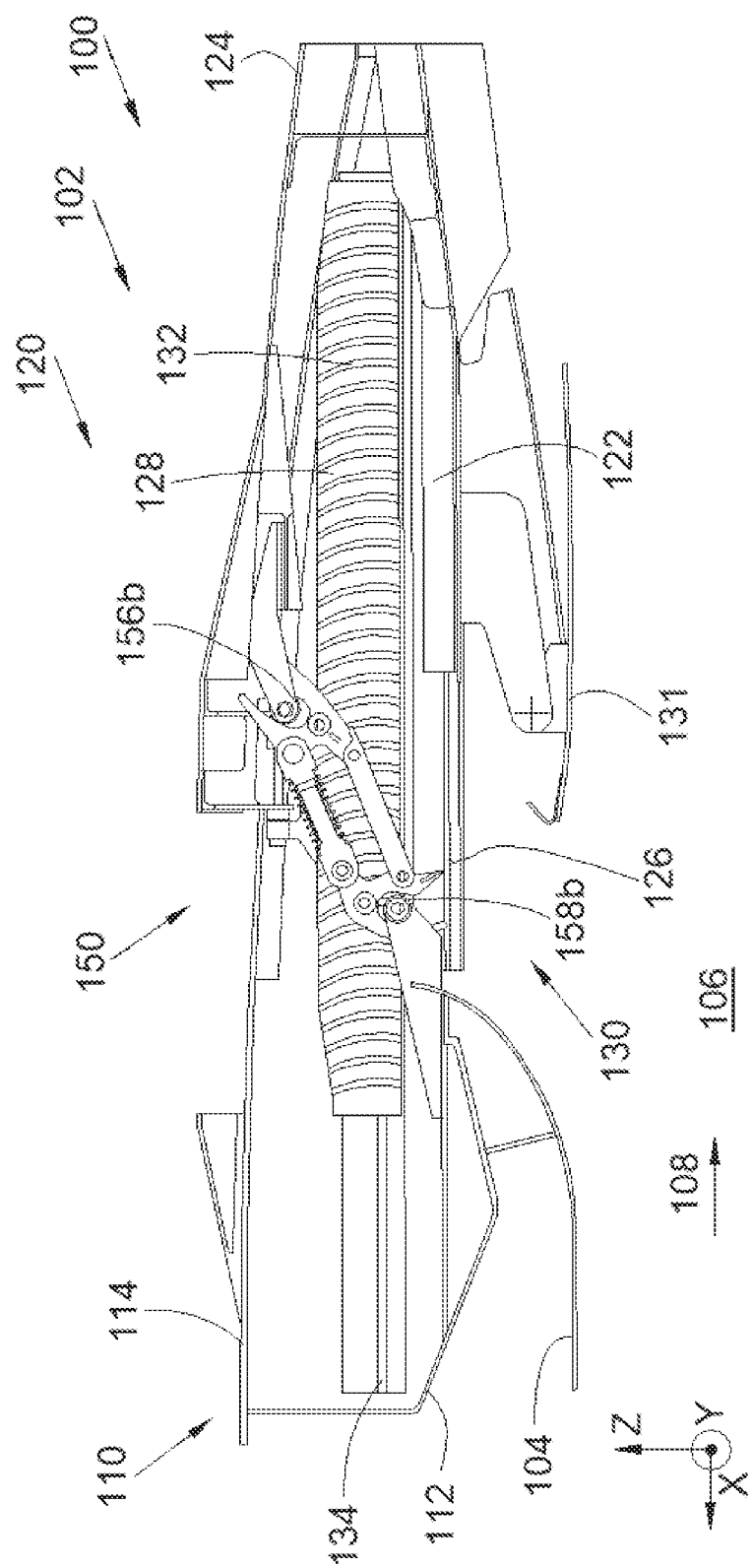
FIG. 4 is the same view as FIG. 2 in a second intermediate position.
Figure 5:
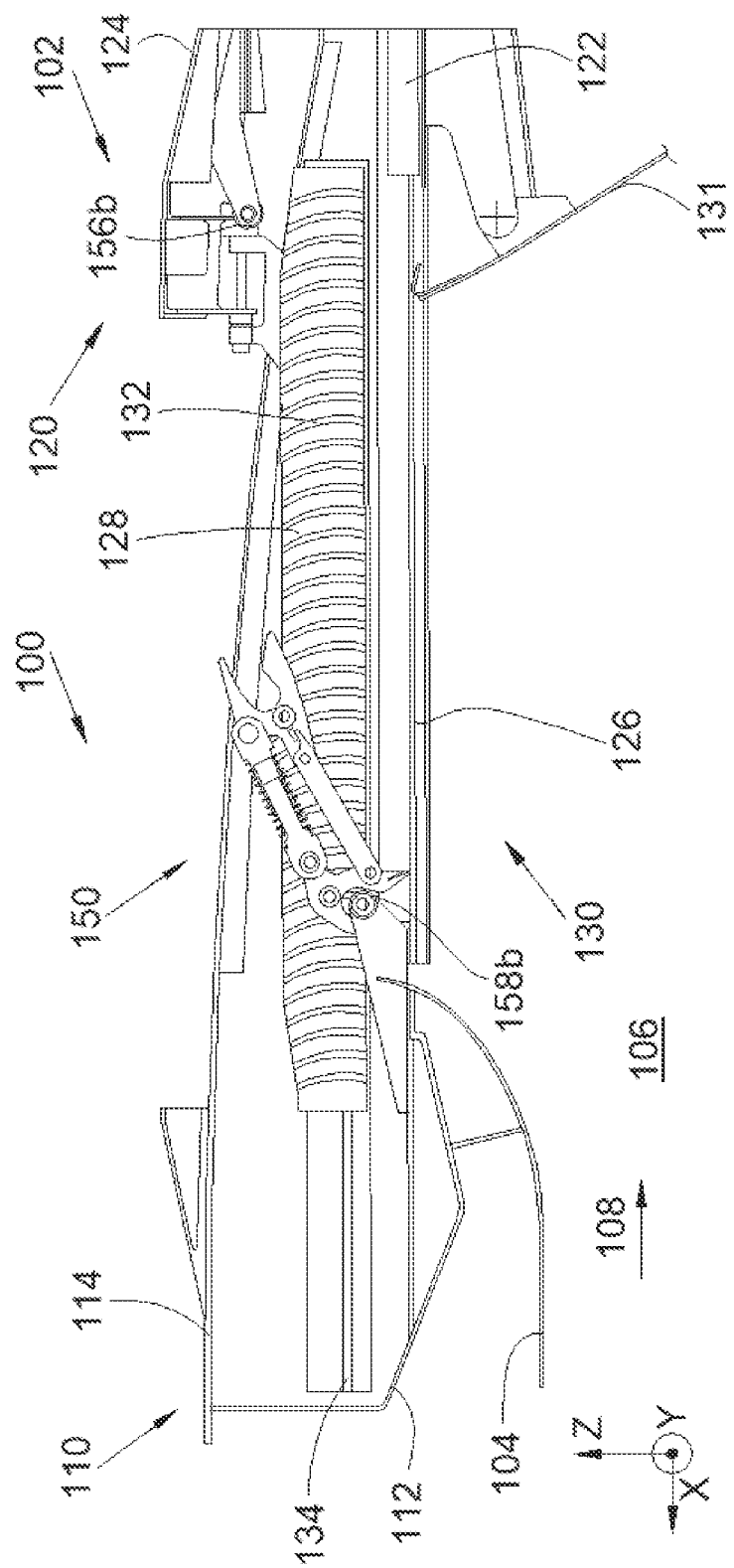
FIG. 5 is the same view as FIG. 2 in the withdrawn position.

FIG. 2 shows the advanced position and FIG. 5 shows the withdrawn position, and FIGS. 3 and 4 show two successive intermediate positions.

In the advanced position, the mobile cowl 124 and the fan casing 104 extend one another so as to define the outer surface of the duct 106. In the same way, the mobile cowl 124 and the fixed cowl 114 extend one another so as to define the outer surface of the nacelle 102.

In the withdrawn position, the mobile cowl 124 and the fan casing 104 are spaced apart from one another and, in the same way, the mobile cowl 124 and the fixed cowl 114 are spaced apart from one another so as to define between them a window 130 that is open between the duct 106 and the outside of the nacelle 102. Thus, the air from the secondary flow 108 passes through the window 130 to end up outside the nacelle 102.

The fan casing 104 and the fixed cowl 114 delimit the front of the window 130, and the mobile cowl 124 delimits the rear of the window 130.

In order to redirect the secondary flow 108 towards the window 130, the nacelle 102 has a plurality of reverser flaps 131 distributed in the duct 106.

Each reverser flap 131 takes a form known to those skilled in the art and is not described further since it does not form part of the invention, and each reverser flap 131 is mounted articulated on the mobile assembly 120 between a deployed position (FIG. 5) in which it partially closes off the duct 106 at the rear of the window 130 and a stowed position (FIG. 2) in which it does not close off the duct 106 and vice versa. Thus, in the deployed position, the reverser flaps 131 redirect the secondary flow 108 towards the window 130 and the outside.

The slider 122 is guided relative to the fixed structure 110 by a first guiding system constituted, in this case, of a set of slideways 126 that are fastened to the fixed structure 110, for example to a 12 o'clock beam and to a 6 o'clock beam of the fixed structure 110. Of course, any other guiding system is possible, such as a rail, for example.

The movement of the slider 122 along the fixed structure 110 is controlled by actuators (not shown) and controlled by a control unit, for example of the processor type, which controls the movements in one direction or the other according to the requirements of the aircraft 10. Each actuator is thus designed to move, from the advanced position, the slider 122 in translation in the direction of translation to the withdrawn position, and vice versa. There may be a plurality of actuators distributed angularly around the longitudinal axis X. Each actuator is, for example, a hydraulic jack that has a cylinder as one with the fixed structure 110 and a rod that is able to move inside the cylinder and as one with the slider 122.

The nacelle 102 also has deflectors 132 (also called "cascades") that are fastened, for example, inside a frame 128 that is also able to move in translation in the direction of translation between an advanced position (FIG. 2) and a withdrawn position (FIGS. 4 and 5) and vice versa. The deflectors 132, for example by way of the frame 128, are therefore mounted so as to be able to move on the fixed structure 110, also in this case, for example, between the 12 o'clock beam and the 6 o'clock beam.

The frame 128 is guided with respect to the fixed structure 110 by a second guiding system constituted in this case of a set of slideways 134. Of course, any other guiding system is possible, such as a rail, for example.

In the advanced position, which corresponds to the advanced position of the mobile assembly 120, the deflectors 132 are housed between the fan casing 104 and the fixed cowl 114. In the withdrawn position, the deflectors 132 are positioned across the window 130 so as to guide the air of the secondary flow 108 towards the outside.

Figure 6:
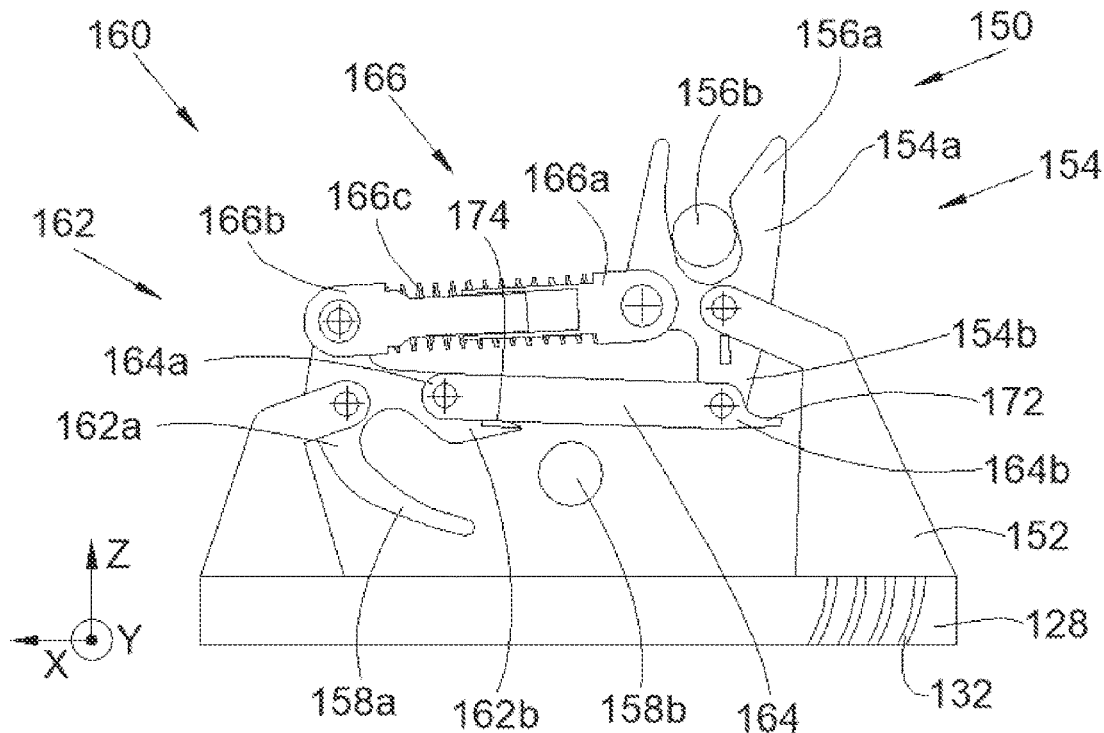
FIG. 6 is a side view of an actuation system according to the invention just before a tilting position.
Figure 7:
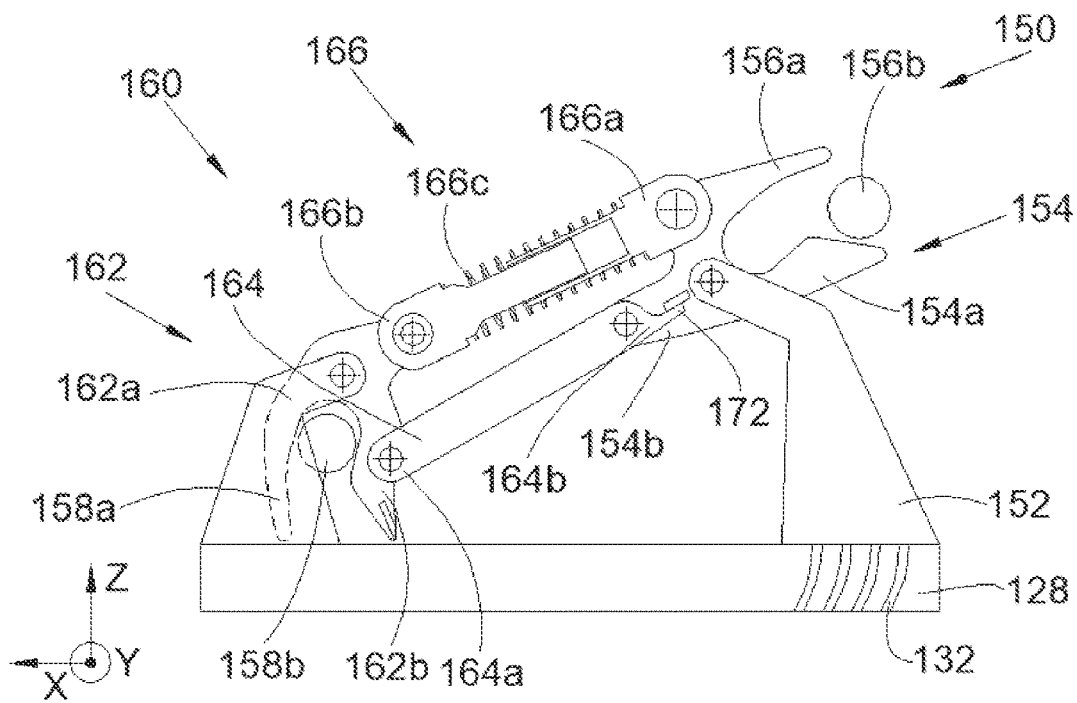
FIG. 7 is a side view of an actuation system according to the invention just after the tilting position.

The deflectors 132 are moved by at least one actuation system 150 shown in detail in FIGS. 6 and 7, respectively in a retracted position corresponding to the advanced position and in a deployed position corresponding to the withdrawn position. In the embodiment of the invention that is presented here, there is one actuation system 150 mounted at the 12 o'clock beam and one at the 6 o'clock beam, but a different number and different locations are possible.

The actuation system 150 has a carriage 152 secured to the deflectors 132, in this case by means of the frame 128 to which the carriage 152 is fastened. The carriage 152 therefore moves in translation in the direction of translation.

The actuation system 150 also has a blocking lever 154 that is mounted articulated on the carriage 152 and that bears, in this case at a first end 154a, first blocking means 156a that are designed to cooperate with second blocking means 156b as one with the mobile assembly 120.

The blocking lever 154 is able to move in rotation about its articulation between a blocking position (FIG. 6) in which the first blocking means 156a are secured to the second blocking means 156b and a free position (FIG. 7) in which the first blocking means 156a are not secured to the second blocking means 156b, and vice versa. In the blocking position, the carriage 152 is secured to the mobile assembly 120 and moves with it, and in the free position, the carriage 152 is not secured to the mobile assembly 120 and it is stationary while the mobile assembly 120 can move.

In the embodiment of the invention that is presented in FIGS. 6 and 7, the first blocking means 156a take the form of a channel and the second blocking means 156b take the form of a rod that is housed in the channel in the blocking position. In the blocking position, the opening of the channel is oriented perpendicular to the direction of translation, and, in the free position, the opening of the channel is oriented towards the rear, parallel to the direction of translation.

The actuation system 150 also has a transmission system 160 that has means for moving the blocking lever 154 from the blocking position to the free position when the mobile assembly 120 reaches a tilting position between its advanced position and its withdrawn position starting from its advanced position, and, conversely, the transmission system 160 has means for moving the blocking lever 154 from the free position to the blocking position when the mobile assembly 120 reaches the tilting position between its withdrawn position and its advanced position starting from its withdrawn position.

Thus, starting from the advanced position of the mobile assembly 120 and the deflectors 132 (FIG. 2), the mobile assembly 120 moves towards the rear (FIG. 3) and drives the blocking lever 154 in translation as a result of the securing of the first and second blocking means 156a-b, and therefore also the carriage 152 and the deflectors 132 until the tilting position (FIG. 4) is reached, in which the transmission system 160 moves the blocking lever 154 from the blocking position to the free position, thus releasing the first and second blocking means 156a-b, and this allows the mobile assembly 120 to continue its movement towards the withdrawn position (FIG. 5) while the carriage 152 and the deflectors 132 remain in place, i.e., when the deflectors 132 are in the withdrawn position. The tilting position thus corresponds to the withdrawn position of the deflectors 132, in which they are across the window 130, i.e., when the mobile assembly 120 is in the tilting position, the deflectors 132 are in the withdrawn position.

Conversely, starting from the withdrawn position of the mobile assembly 120, the latter moves towards the front until it reaches the tilting position, in which the first and second blocking means 156a-b come into contact and in which the second blocking means 156b push the first blocking means 156 and thus move the blocking lever 154 from the free position to the blocking position, securing the mobile assembly 120, the carriage 152 and the deflectors 132 to one another, and the mobile assembly 120 continues its movement towards the advanced position, driving the blocking lever 154 and therefore also the carriage 152 and the deflectors 132 towards the advanced position of the mobile assembly 120 and the deflectors 132.

Such an arrangement thus makes it possible to move the deflectors 132 during the movement of the mobile assembly 120 and to store them beneath the fixed cowl 114 in the advanced position, thus reducing the bulk at the mobile cowl 124.

The transmission system 160 has a stopping lever 162 that is mounted articulated on the carriage 152 and that bears, in this case at a first end 162a, first stopping means 158a that are designed to cooperate with second stopping means 158b as one with the fixed structure 110.

The stopping lever 162 is able to move in rotation about its articulation between a standby position (FIG. 6) in which the first stopping means 156a are not secured to the second stopping means 158b and a stopping position (FIG. 7) in which the first stopping means 156a are secured to the second stopping means 158b and vice versa. In the standby position, the carriage 152 is not secured to the fixed structure 110 and moves with the mobile assembly 120, and in the stopping position, the carriage 152 is secured to the fixed structure 110 and is stationary while the mobile assembly 120 can move.

In the embodiment of the invention that is presented in FIGS. 6 and 7, the first stopping means 158a take the form of a channel and the second stopping means 158b take the form of a rod that is housed in the channel in the stopping position. In the stopping position, the opening of the channel is oriented perpendicular to the direction of translation, and, in the standby position, the opening of the channel is oriented towards the rear, parallel to the direction of translation.

The transmission system 160 has an arm 164 with a first end 164a mounted articulated with a second end 162b of the stopping lever 162 and a second end 164b mounted articulated with a second end 154b of the blocking lever 154.

The arm 164 is arranged such that the tilting of the stopping lever 162 from the standby position to the stopping position corresponds to the tilting of the blocking lever 154 from the blocking position to the free position and corresponds to the tilting position and such that the tilting of the blocking lever 154 from the free position to the blocking position corresponds to the tilting of the stopping lever 162 from the stopping position to the standby position and corresponds to the tilting position.

The transmission system 160 has at least one damper 166. For each damper 166, a first end of the damper 166 is mounted articulated to the blocking lever 154, in this case in the vicinity of the first end 154*a*, and a second end is mounted articulated to the stopping lever 162, in this case in the vicinity of the first end 162*a*.

The damper 166 is constituted, in this case, of a female tube 166*a* of which a proximal end is mounted articulated to the blocking lever 154 and constitutes the first end of the damper 166, and a male tube 166*b* of which a proximal end is mounted articulated to the stopping lever 162 and constitutes the second end of the damper 166.

The distal end of the male tube 166*b* is mounted so as to be able to slide inside the distal end of the female tube 166*a*.

Of course, a reverse mounting is also possible.

The damper 166 also has a spring 166*c*, typically a compression spring, which is mounted compressed between the female tube 166*a* and the male tube 166*b*.

During the movement of the mobile assembly 120 from the advanced position to the withdrawn position under the action of the actuators, the deflectors 132 and therefore the carriage 152 are driven from the advanced position to the withdrawn position, which corresponds to the passage of the mobile assembly 120 through the tilting position. The driving of the deflectors 132 is due to the fact the blocking lever 154 is in the blocking position while the stopping lever 162 is in the standby position.

When the tilting position is reached, the second stopping means 158*b* meet the first stopping means 158*a*, thus driving the tilting of the stopping lever 162 towards the stopping position and, by action of the arm 164, also the tilting of the blocking lever 154 from the blocking position to the free position. This tilting brings about the release of the second blocking means 156*b*, and the mobile assembly 120 continues its movement to its withdrawn position while the deflectors 132 and the carriage 152 remain in place.

In order to limit the tilting angle of the blocking lever 154 in the free position, the blocking lever 154 comes to abut against a first stop 172 of the arm 164 that prevents the blocking lever 154 from pivoting too far.

Conversely, during the movement of the mobile assembly 120 from the withdrawn position to the advanced position under the action of the actuators, the mobile assembly 120 moves towards the front, passing through the tilting position, while the carriage 152 and the deflectors 132 remain stationary.

When the mobile assembly 120 reaches the tilting position, the second blocking means 156*b* meet the first blocking means 156*a*, thus driving the tilting of the blocking lever 154 from the free position to the blocking position and, by action of the arm 164, also the tilting of the stopping lever 162 from the stopping position to the standby position. The carriage 152 and the deflectors 132 then again become secured to the mobile assembly 120 and they continue to move towards the front with it to the advanced position.

In order to limit the tilting angle of the stopping lever 162 in the standby position, the stopping lever 162 comes to abut against a second stop 174 of the arm 164 that prevents the stopping lever 162 from pivoting too far.

During all these movements, each damper 116 remains under load in order to avoid any jolting of the various components of the actuation system 150. Such an actuation system 150 is also particularly compact and does not generate impacts during movements.

All the articulations are in this case rotations of which the axes are mutually parallel.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan having a motor with a fan casing and a nacelle that surrounds the motor, wherein a duct for a secondary flow is delimited between the nacelle and the motor, said nacelle having:
   a fixed structure having a fixed cowl around the fan casing and second stopping means,
   a mobile assembly that is configured to move in translation on the fixed structure and has second blocking means and a slider bearing a mobile cowl, wherein the mobile assembly is configured to move between an advanced position in which the slider is positioned such that the mobile cowl is close to the fan casing and the fixed cowl and a withdrawn position in which the slider is positioned such that the mobile cowl is distanced from the fan casing and the fixed cowl so as to define between them a window that is open between the duct and outside of the nacelle,
   actuators configured to move, from the advanced position, the slider in translation to the withdrawn position and vice versa,
   deflectors mounted so as to be able to move in translation on the fixed structure between an advanced position corresponding to the advanced position of the mobile assembly in which the deflectors are housed between the fan casing and the fixed cowl and a withdrawn position in which the deflectors are positioned across the window, and
   at least one actuation system, each one having:
      a carriage secured to the deflectors,
      a blocking lever mounted articulated on the carriage and bearing first blocking means, wherein the blocking lever is able to move in rotation between a blocking position in which the first blocking means are secured to the second blocking means and a free position in which the first blocking means are not secured to the second blocking means and vice versa, and
      a transmission system configured to move the blocking lever from the blocking position to the free position when the mobile assembly reaches a tilting position between its advanced position and its withdrawn position starting from its advanced position, and also, to move the blocking lever from the free position to the blocking position when the mobile assembly reaches the tilting position between its withdrawn position and its advanced position starting from its withdrawn position, wherein, when the mobile assembly is in the tilting position, the deflectors are in their withdrawn position, and wherein the transmission system has:

a stopping lever mounted articulated on the carriage and bearing first stopping means, wherein the stopping lever is able to move in rotation between a standby position in which the first stopping means are not secured to the second stopping means and a stopping position in which the first stopping means are secured to the second stopping means and vice versa, and an arm with a first end mounted articulated with the stopping lever and a second end mounted articulated with the blocking lever, wherein the arm is arranged such that tilting of the stopping lever from the standby position to the stopping position corresponds to tilting of the blocking lever from the blocking position to the free position and such that tilting of the blocking lever from the free position to the blocking position corresponds to tilting of the stopping lever from the stopping position to the standby position, wherein the transmission system has at least one damper and wherein, for each damper, a first end of said damper is mounted articulated to the blocking lever and a second end is mounted articulated to the stopping lever.

2. The turbofan according to claim 1, wherein, in the free position, the blocking lever comes to abut against a first stop of the arm.

3. The turbofan according to claim 1, wherein, in the standby position, the stopping lever comes to abut against a second stop of the arm.

4. An aircraft having at least one turbofan according to claim 1.

* * * * *